United States Patent
Niewiadomski et al.

(10) Patent No.: US 11,040,588 B2
(45) Date of Patent: Jun. 22, 2021

(54) VEHICLE AND SYSTEM HAVING TRAILER COUPLER CONNECTION DETECTION

(71) Applicant: Ford Global Technologies, LLC, Dearborn, MI (US)

(72) Inventors: Luke Niewiadomski, Dearborn, MI (US); Jacek Brauner, Plymouth, MI (US); Mark Allen Lippman, New Baltimore, MI (US); Lihui Chen, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 16/404,923

(22) Filed: May 7, 2019

(65) Prior Publication Data

US 2020/0353782 A1 Nov. 12, 2020

(51) Int. Cl.
*B60D 1/36* (2006.01)
*B60D 1/06* (2006.01)
*B60D 1/28* (2006.01)
*B60R 1/00* (2006.01)

(52) U.S. Cl.
CPC ............... *B60D 1/36* (2013.01); *B60D 1/06* (2013.01); *B60D 1/28* (2013.01); *B60R 1/003* (2013.01); *B60R 2300/105* (2013.01); *B60R 2300/303* (2013.01); *B60R 2300/808* (2013.01)

(58) Field of Classification Search
CPC .... B60D 1/36; B60D 1/06; B60D 1/28; B60R 1/003; B60R 2300/808; B60R 2300/105; B60R 2300/303; B60R 1/00
See application file for complete search history.

(56) References Cited

U.S. PATENT DOCUMENTS

| | | | |
|---|---|---|---|
| 7,535,346 B2 * | 5/2009 | Kalous ................ | B60Q 1/305 340/425.5 |
| 9,987,892 B2 | 6/2018 | Ghannam et al. | |
| 10,059,161 B1 | 8/2018 | Salter et al. | |
| 10,940,889 B2 * | 3/2021 | Bradley ............... | B60D 1/245 |

FOREIGN PATENT DOCUMENTS

CN 106864187 A 6/2017

* cited by examiner

*Primary Examiner* — Tony H Winner
*Assistant Examiner* — Marlon A Arce
(74) *Attorney, Agent, or Firm* — Raymond Coppiellie; Price Heneveld LLP (57) ABSTRACT

A vehicle is provided with a trailer hitch, a camera oriented to capture images of the trailer hitch, and a controller processing the captured images, detecting a trailer coupler coupled to the trailer hitch, determining a locked or unlocked state of the hitch coupler by comparing the captured images to known trailer coupler images, and generating an output indicative of the determined state of the trailer coupler.

15 Claims, 10 Drawing Sheets

VEHICLE AND SYSTEM HAVING TRAILER COUPLER CONNECTION DETECTION

FIELD OF THE INVENTION

The present invention generally relates to vehicle trailer connections, and more particularly relates to a system and vehicle for detecting the connection state of a trailer to a vehicle.

BACKGROUND OF THE INVENTION

Many motor vehicles are commonly equipped with trailer hitches that enable the vehicle to connect with and tow a trailer. With many trailer hitch arrangements, the trailer has a coupler that engages onto and connects to the vehicle trailer hitch typically via a hitch ball. The hitch coupler typically includes a coupler lock that is actuated between a locked and unlocked position by actuating a coupler lock lever. The coupler lock ensures that a vertical force is unable to force the coupler off of the trailer hitch during driving of the vehicle trailer combination. In some situations, the vehicle operator may forget to actuate the coupler lock lever to the locked position when connecting a trailer to the hitch which can lead to disconnection of the trailer from the hitch. It may be desirable to provide for a vehicle and system that detects that the vehicle and trailer connection is in a locked state while driving the vehicle.

SUMMARY OF THE INVENTION

According to one aspect of the present invention, a vehicle is provided. The vehicle includes a trailer hitch, a camera oriented to capture images of the trailer hitch, and a controller processing the captured images, detecting a trailer coupler coupled to the trailer hitch, determining a locked or unlocked state of the hitch coupler by comparing the captured images to known trailer coupler images, and generating an output indicative of the determined state of the trailer coupler.

Embodiments of the first aspect of the invention can include any one or a combination of the following features:
the known images are learned images;
the learned images are learned by the controller during a calibration procedure by saving images of the hitch coupler in the locked and unlocked states;
the saved images are stored in memory;
the trailer hitch comprises a tow ball;
the vehicle includes a display for displaying the output as a warning to a driver of the vehicle;
the controller further detects the vehicle is in a trailer mode before generating the output;
the controller detects the trailer mode when a driving task is initiated;
the initiation of the driving task comprises a vehicle transmission shifted out of park; and
the controller detects the trailer mode by a user input.

According to another aspect of the present invention, a system for detecting a state of a trailer coupler connected to a vehicle trailer hitch on a vehicle is provided. The system includes a camera oriented to capture images of the vehicle trailer hitch, and a controller processing the captured images, detecting the trailer coupler coupled to the vehicle trailer hitch, determining a locked or unlocked state of the trailer coupler by comparing the captured images to known trailer coupler images, and generating an output indicative of the determined state of the trailer coupler.

Embodiments of the second aspect of the invention can include any one or a combination of the following features:
the known images are learned images;
the learned images are learned by the controller during a calibration procedure by comparing images of the hitch coupler in the locked and unlocked states;
the vehicle trailer hitch comprises a tow ball;
the system includes a display for displaying the output as a warning to a driver of the vehicle;
the controller further detects the vehicle is in a trailer mode before generating the output;
the controller detects the trailer mode when a driving task is initiated;
the initiation of a driving task comprises a vehicle transmission shifted out of park; and
the controller detects the trailer mode by a user input.

According to yet another aspect of the present disclosure, a method for detecting a trailer coupler locked or unlocked state with respect to a trailer hitch of a vehicle is provided. The method includes the steps of capturing images of a trailer hitch of the vehicle, processing the captured images with a controller to detect a trailer coupler coupled to the trailer hitch, determining with the controller a locked or unlocked state of the trailer coupler coupled to the trailer hitch by comparing the captured images to known trailer coupler images, and generating an output indicative of the determined state of the trailer coupler.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
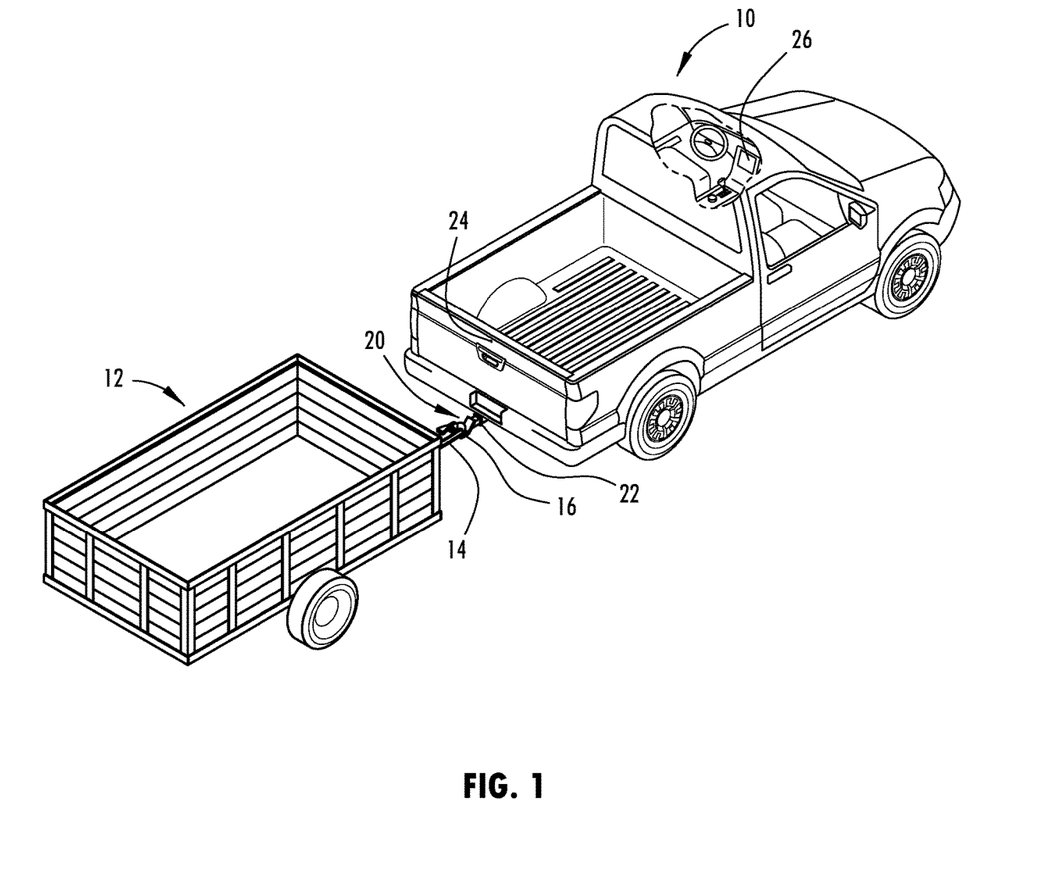
FIG. 1 is a perspective view of a motor vehicle having a trailer hitch connected to a trailer and a trailer coupler lock detection system, according to one embodiment.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-9, a vehicle 10 and a trailer coupler lock detection system 20 for detecting a connection state of a trailer with respect to the vehicle 10 is generally illustrated, according to one embodiment. The vehicle 10 includes a tow or trailer hitch 22 and has the trailer coupler lock detection system 20 that includes a camera 24 oriented to capture images of the vehicle trailer hitch 22 and a controller processing the captured images, detecting a trailer coupler coupled to the trailer hitch, determining a locked or unlocked state on the trailer coupler by comparing the captured images to known trailer coupler images, and generating an output indicative of the determined state of the trailer coupler.

Referring now to FIG. 1, the vehicle 10 is generally illustrated as a motor vehicle having wheels for travel on the ground such as a roadway. The motor vehicle 10 is equipped with a vehicle trailer hitch 22 mounted or assembled to the rear end of the vehicle 10. The vehicle trailer hitch 22 generally includes a tow bar extending from a bracket and having a hitch connecting feature such as a tow ball. The trailer 12 has a trailer tongue 14 extending forward at the front end with a trailer coupler 16 provided on the front end thereof. The trailer coupler 16 is configured to engage the tow ball on the vehicle trailer hitch 22 to connect the trailer 12 to the vehicle 10 and allow the trailer 12 to articulate about the coupler to hitch connection as the vehicle 10 maneuvers with left and right steering directions while travelling.

The vehicle 10 is equipped with the trailer coupler lock detection system 20 for detecting a state of the trailer coupler 16 connected to the vehicle trailer hitch 22. The system 20 includes a camera 24 which is shown located at the rear end of the vehicle 10 and oriented to capture images of the vehicle trailer hitch 22 from an imaging perspective directed rearward of the vehicle 10. The camera 24 is an image generating device that is shown located in an upper portion of the tailgate of the vehicle 10 which is shown as a pick-up truck in one example. However, it should be appreciated that the camera 24 may be located in other locations on any vehicle that enable images of the trailer coupler 16 and the connecting portion of the vehicle trailer hitch 22 to be captured. The captured images are stored in memory and processed by a controller of the system 20 as described herein.

The system 20 also includes a human machine interface (HMI) in the form of a touchscreen display 26 shown located within a passenger compartment of the vehicle 10. The display 26 may be located in a position that is readily viewable by a driver of the vehicle 10 and may provide a visual warning as an output. In the example shown, the display 26 is provided within an entertainment system located within the dashboard of the vehicle generally forward of the driver. The HMI display or other device(s) within vehicle 10 may provide other outputs such as audible and/or visible outputs.

The vehicle 10 is equipped with the trailer coupler lock detection system 20 to detect the trailer coupler 16 in a locked or unlocked state with respect to the vehicle trailer hitch 22. This is achieved by employing a controller that processes the captured images, detects a trailer coupler coupled to the vehicle trailer hitch, determines a locked or unlocked state of the hitch coupler by comparing the captured images to known trailer coupler images, and generates an output indicative of the determined state of the trailer coupler 16. The output may be in the form of a displayed message, such as a warning, visually shown on the display 26, another visual output or an audible output or any other output indicative of the determined state of the trailer coupler and any control action required in response to the output.

Referring to FIGS. 2A-2D, various examples of trailer couplers 16 mounted on trailers and each positioned at a location to be connected onto a hitch ball 28 of the vehicle trailer hitch 22 are illustrated. It should be appreciated that there exist a number of trailer couplers 16 for use on trailers that are configured to connect to vehicle trailer hitches. Existing trailer couplers have different shapes, sizes, and structures and may include any of a number of connecting features. In the example shown in FIG. 2A, the trailer coupler 16 which is located on the front end of trailer tongue 14 generally includes a forwardmost cap 30 having a generally cylindrical shape interior volume portion that is open at the bottom side thereof for receiving the hitch ball 28. The hitch ball 28 has a spherical portion of a size and shape sufficient to fit within the cap 30, articulate relative to the cap 30 and be releasibly captured by the trailer coupler 16. The trailer coupler 16 further includes a coupler lock lever 32 which is shown in solid lines in an upward extended unlocked state and in dashed lines in the horizontal locked state.

Figure 2A:
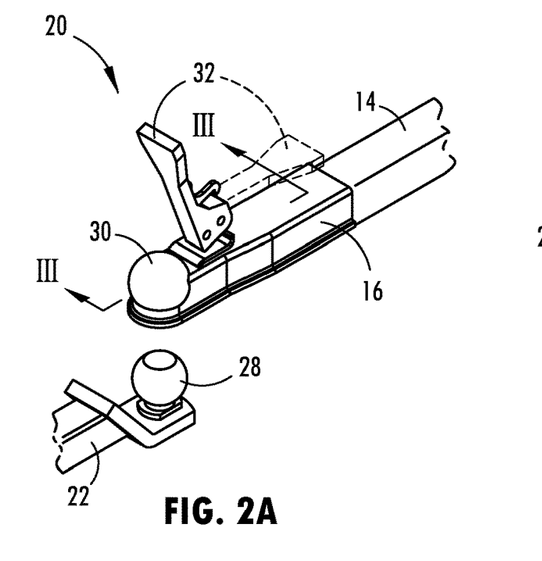
FIG. 2A is a perspective view of a portion of a vehicle trailer hitch aligned for connection with a trailer configured with a first example of a hitch coupler shown in an unlocked state.
Figure 3:
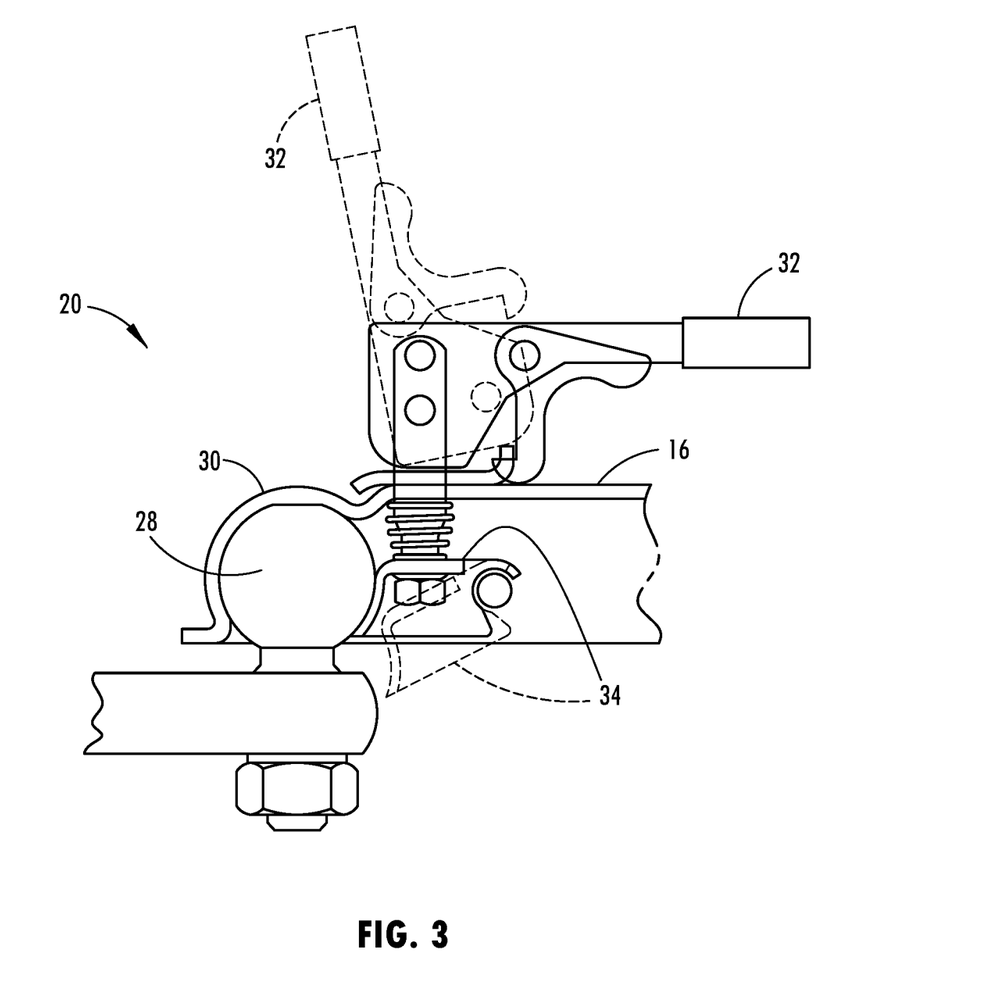
FIG. 3 is a cross-sectional view taken through one example of the hitch coupler shown in FIG. 2A.

The coupler lock lever 32 is actuatable by a user to position a coupler lock 34 which is shown in FIG. 3 such that the coupler lock 34 engages the hitch ball 28 within a lower portion of the cap 30 to prevent the removal of the hitch ball 28 from the cap 30 when the coupler lock lever 32 is pivoted downward to a horizontal position shown in solid lines in the locked state. As such a user may move by pivoting the coupler lock lever 32 to the upward unlocked state shown by dashed lines to insert or remove the cap 30 on hitch ball 28 and may pivot the coupler lock lever 32 downward to the locked state to lock the cap 30 and therefore the coupler 16 onto the hitch ball 28.

Figure 2B:
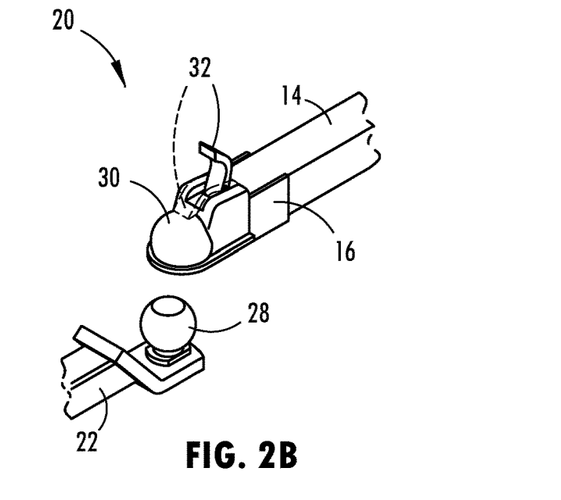
FIG. 2B is a perspective view of a portion of a vehicle trailer hitch aligned for connection with a trailer configured with a second example of a hitch coupler shown in an unlocked state.

Referring to FIG. 2B, a trailer coupler 16 is shown having a different configuration according to a second example. In this example, the coupler lock lever 32 has a different size and shape. As seen in FIG. 2B, the lever 32 extends vertical or upright as shown in solid lines in the unlocked state. A user may pull up and pivot the lever 32 rearward and downward to a horizontal position shown in dashed lines to lock the trailer coupler 16 onto the hitch ball 28 in the locked state.

Figure 2C:
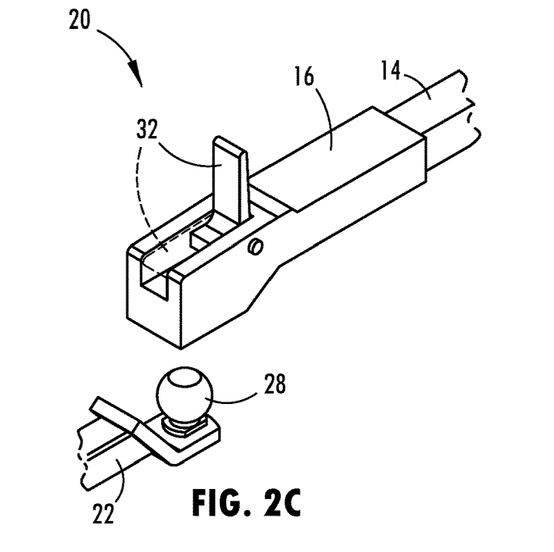
FIG. 2C is a perspective view of a portion of a vehicle trailer hitch aligned for connection with a trailer configured with a third example of a hitch coupler shown in an unlocked state.

Referring to FIG. 2C, a trailer coupler 16 is shown having yet another different shaped housing and coupler lock lever 32, according to a third example. In this example, the coupler lock lever 32 is shown by solid lines extending vertical in an unlocked state and may be pivoted by a user forward and downward to a horizontal position shown by dashed lines in the locked state. The cap receiving portion is disposed in the bottom side of the rectangular housing and thus is hidden in the housing which results in a different shape than other examples.

Figure 2D:
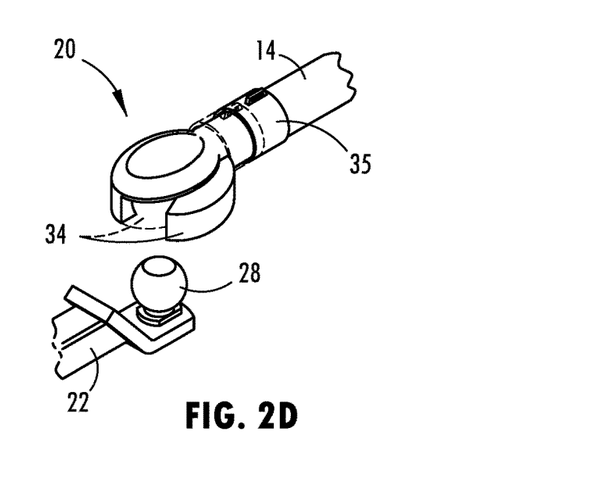
FIG. 2D is a perspective view of a portion of a vehicle trailer hitch aligned for connection with a trailer configured with a fourth example of a hitch coupler shown in an unlocked state.

FIG. 2D illustrates a hitch coupler 16 having yet another configuration having a collar lock according to a fourth example. The hitch coupler 16 is shown having a different shaped lock actuator shown as a collar 35 shown with the trailer coupler in the unlocked state. The collar lock 35 may be actuated by a user to slide forward on the trailer tongue 14 as shown by dashed lines to a position to lock the coupler lock 34 and hence the hitch coupler in the locked state.

In each of the examples provided in FIGS. 2A-2D, the hitch coupler 16 has different shapes and sizes and thus, a different overall appearance for connecting with a trailer hitch and each hitch coupler 16 has a coupler lock actuator such as a lever 32 or collar that is actuatable by a user to different positions that define a locked and an unlocked state. The system 20 advantageously processes the images to detect the hitch coupler 16 and determines whether the hitch coupler 16 is positioned in a locked state or an unlocked state. In order to do so, the system 20 may employ a plurality of known coupler images that may include images of the hitch coupler in both the locked and unlocked state for any of a plurality of examples of hitch couplers. Additionally, the known trailer coupler images may be acquired and saved in memory during a learning process by which the system 20 may learn the locked and unlocked states of a particular hitch coupler that is employed by the vehicle in the past or that has been employed by other vehicles and made available through a memory download or remote download such as from a cloud-based server.

Figure 4A:
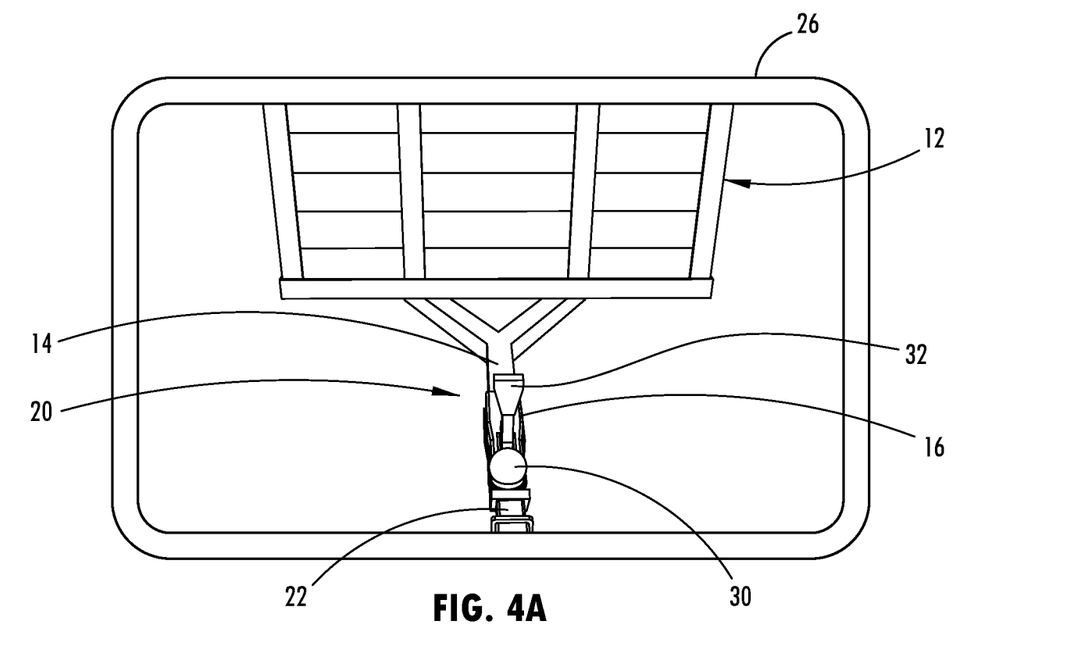
FIG. 4A is a captured mage of the hitch coupler connected onto the vehicle trailer hitch with the hitch coupler in the unlocked state.
Figure 4B:
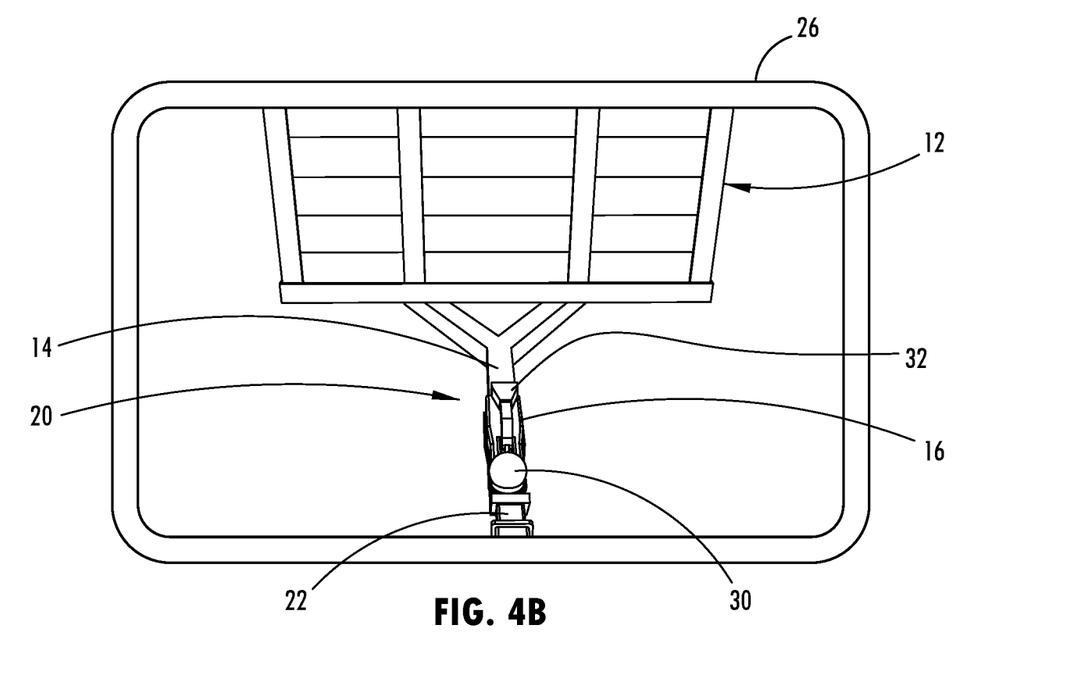
FIG. 4B is a captured mage of the hitch coupler connected onto the vehicle trailer hitch with the hitch coupler in the locked state.

Referring to FIGS. 4A and 4B, one example of images captured by the camera 24 of a trailer coupler 16 shown in an unlocked and locked state are illustrated. In FIG. 4A, the trailer coupler 16 of FIG. 2A is shown in an image captured by the camera 24 with the coupler lock lever 32 in the upright unlocked state. In FIG. 4B, an image of the trailer coupler 16 shown in FIG. 4A is shown with the coupler lock lever 32 shown in the horizontal locked state. It should be appreciated that the system 20 employs a controller that may include one or more image processors that compares captured images of the coupler lock actuator such as the lever connected onto the vehicle trailer hitch and determines the state of the trailer coupler 16 based on the comparison and generates an output indicative of the determined state of the trailer coupler 16. The controller may compare the images to known trailer couplers to detect the type of trailer coupler and may compare the lock actuator, e.g., lever position with known lock actuator or levers positioned in stored images to detect the lever state. The image processing may use known image recognition techniques to detect coupler types and the locked and unlocked states.

Figure 5:
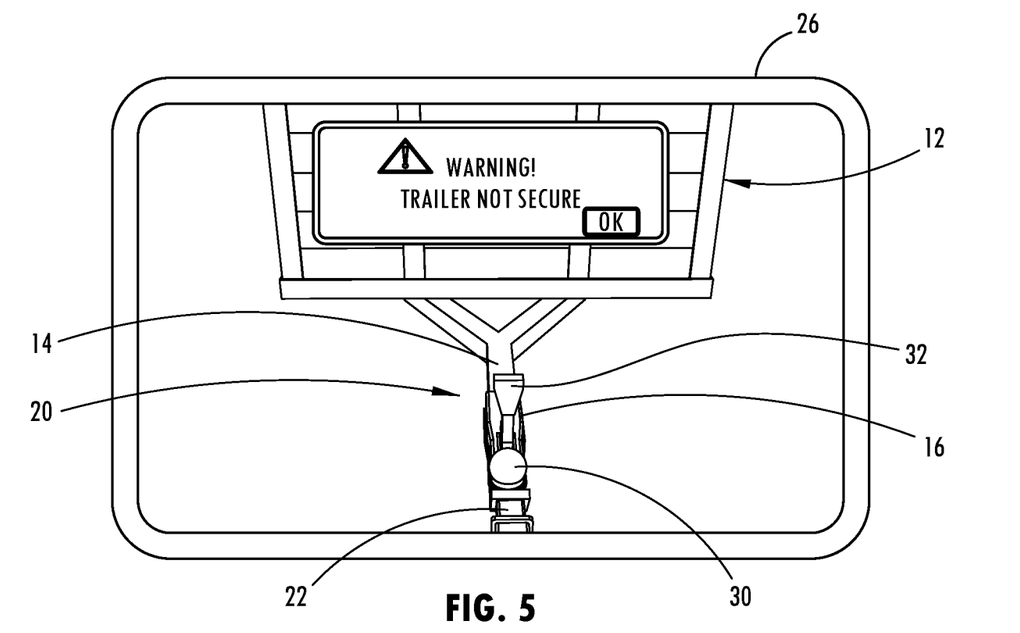
FIG. 5 is a front view of the HMI display illustrating an output warning generated by the trailer coupler lock detection system indicating the hitch coupler is in the unlocked state.

Referring to FIG. 5, one example of an output generated by the system 20 is illustrated. In this example, the display 26 displays to a driver of the vehicle a visual warning message indicating that the trailer is not fully secured to the vehicle when the hitch coupler 16 is determined to be in the unlocked state with the lock actuator lever 32 unlocked as shown. It should be appreciated that other types of outputs such as visual and audible warnings and controlled actions such as braking or otherwise controlling the vehicle may be implemented in response to the output.

Figure 6A:
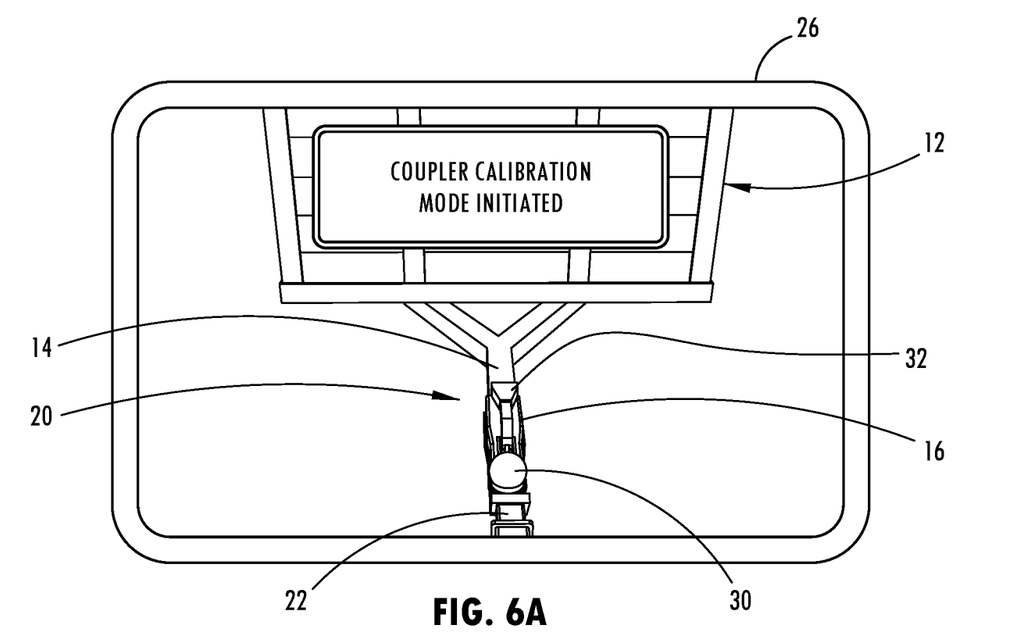
FIG. 6A is a front view of the display illustrating a step in the calibration process for learning the hitch coupler locked and unlocked states.
Figure 6B:
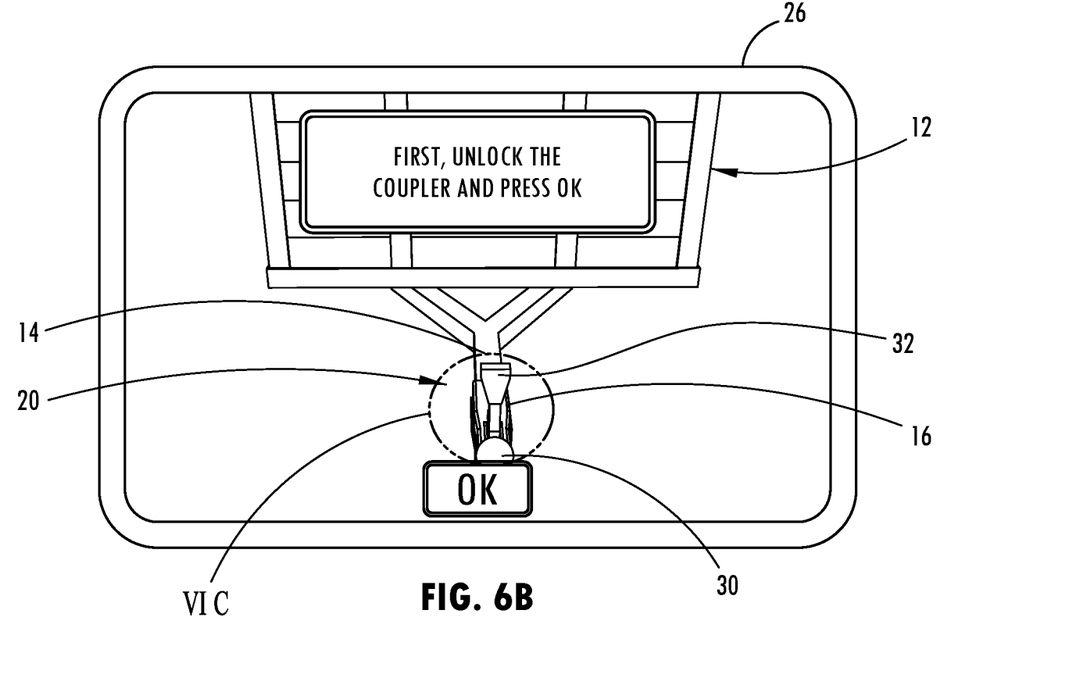
FIG. 6B is a front view of the display illustrating another step in the calibration process for learning the hitch coupler locked and unlocked states.
Figure 6C:
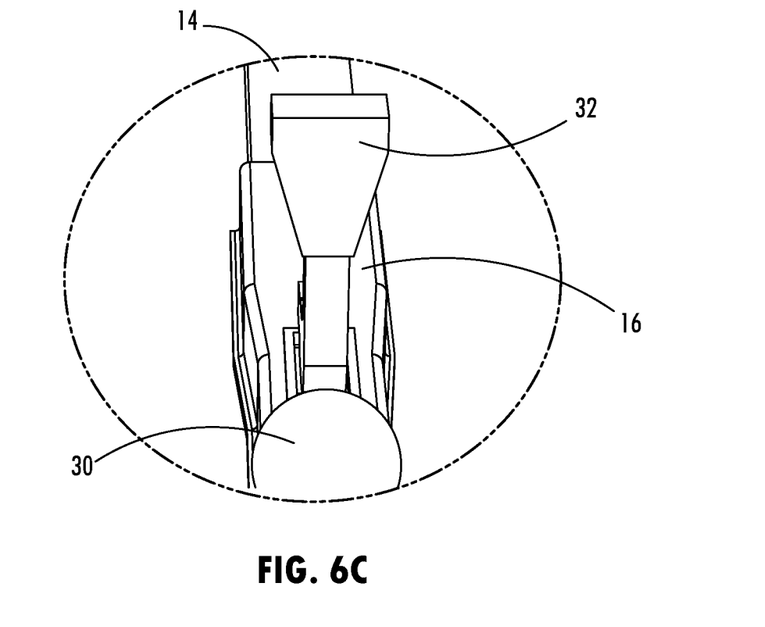
FIG. 6C is an enlarged view of section 6C of FIG. 6B further illustrating the hitch coupler in the unlocked state.
Figure 6D:
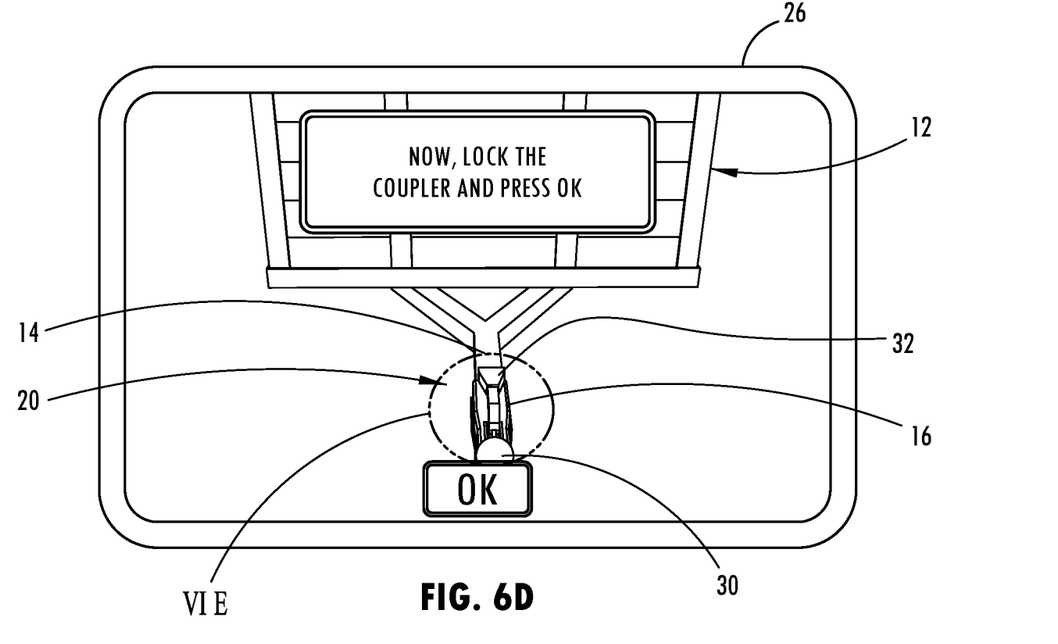
FIG. 6D is a front view of the display illustrating a further step in the calibration process for learning the hitch coupler locked and unlocked states.
Figure 6E:
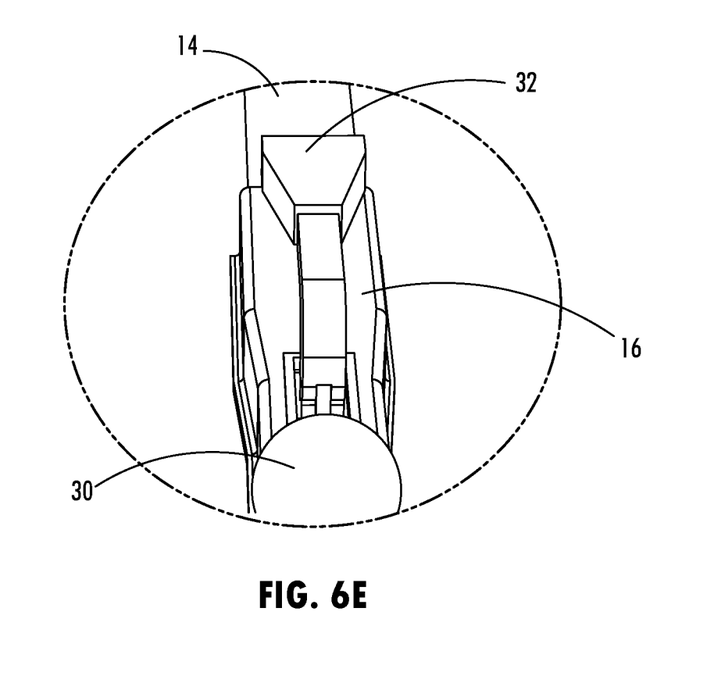
FIG. 6E is an enlarged view of section 6E of FIG. 6D further illustrating the hitch coupler in the locked state.

The system 20 may undergo a calibration mode to learn and store images of a particular trailer coupler in both the unlocked and locked states for use by the system 20. Referring to FIGS. 6A-6E, one example of steps of the calibration mode process is illustrated, according to one embodiment. As seen in FIG. 6A, the coupler calibration mode is initiated by providing a message on the display 26 that is viewable by the driver of the vehicle. Next, the display 26 displays a message to the driver to unlock the coupler and to press an okay button input on the touchscreen as seen in FIG. 6B once the coupler is unlocked. The trailer coupler is shown in the unlocked state in FIG. 6C. Next, the display 26 displays to the driver to lock the coupler and to press the okay input button on the touch screen once the coupler is locked. The trailer coupler shown in the locked position is seen in FIG. 6E. During this calibration process, the system 20 advantageously stores in memory the images captured by the camera of the trailer coupler shown in the unlocked state as seen in FIG. 6B and 6C and as seen in the locked state as shown in FIGS. 6D and 6E. The stored images may then be used by the system 20 to compare with the captured images of the trailer hitch 22 and hitch coupler 16 while operating the vehicle to generate the output.

Figure 7:
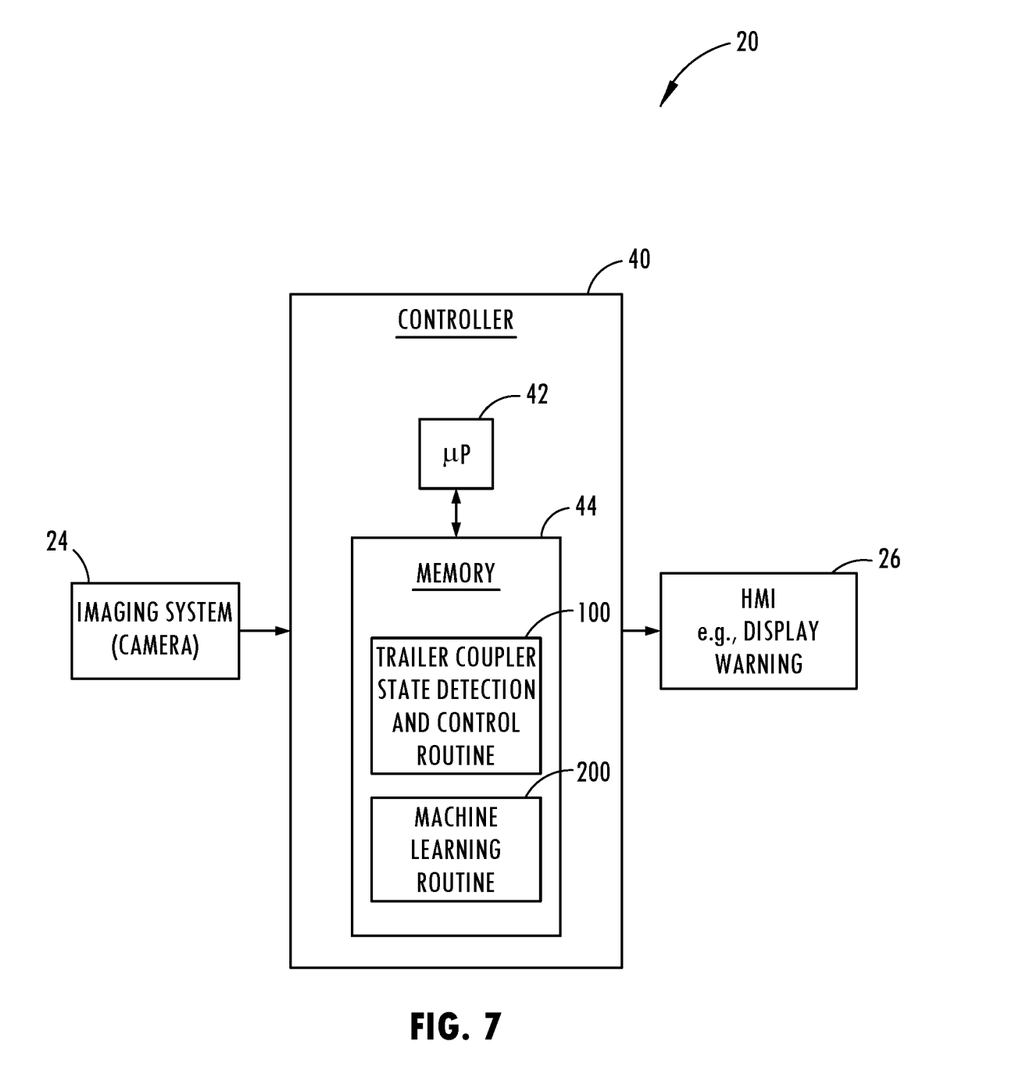
FIG. 7 is a block diagram illustrating the trailer coupler lock detection system and controls, according to one embodiment.

Referring to FIG. 7, the trailer coupler lock detection system 20 is generally illustrated having a controller 40 that receives the images captured by the camera 24 and provides the output to the HMI display 26 as a visual warning. The controller 40 may include a shared controller on a vehicle or may be a dedicated controller dedicated to detecting the trailer coupler locked and unlocked state and providing an output signal and control functions based thereon. The controller 40 may include a microprocessor 42 or other process circuitry. Additionally, the controller 40 includes memory 44 which may store a trailer coupler state detection and control routine 100 and a machine learning routine 200 that are processed by a microprocessor. Also stored in memory 44 may be known trailer coupler images in both the locked and unlocked states.

Figure 8:
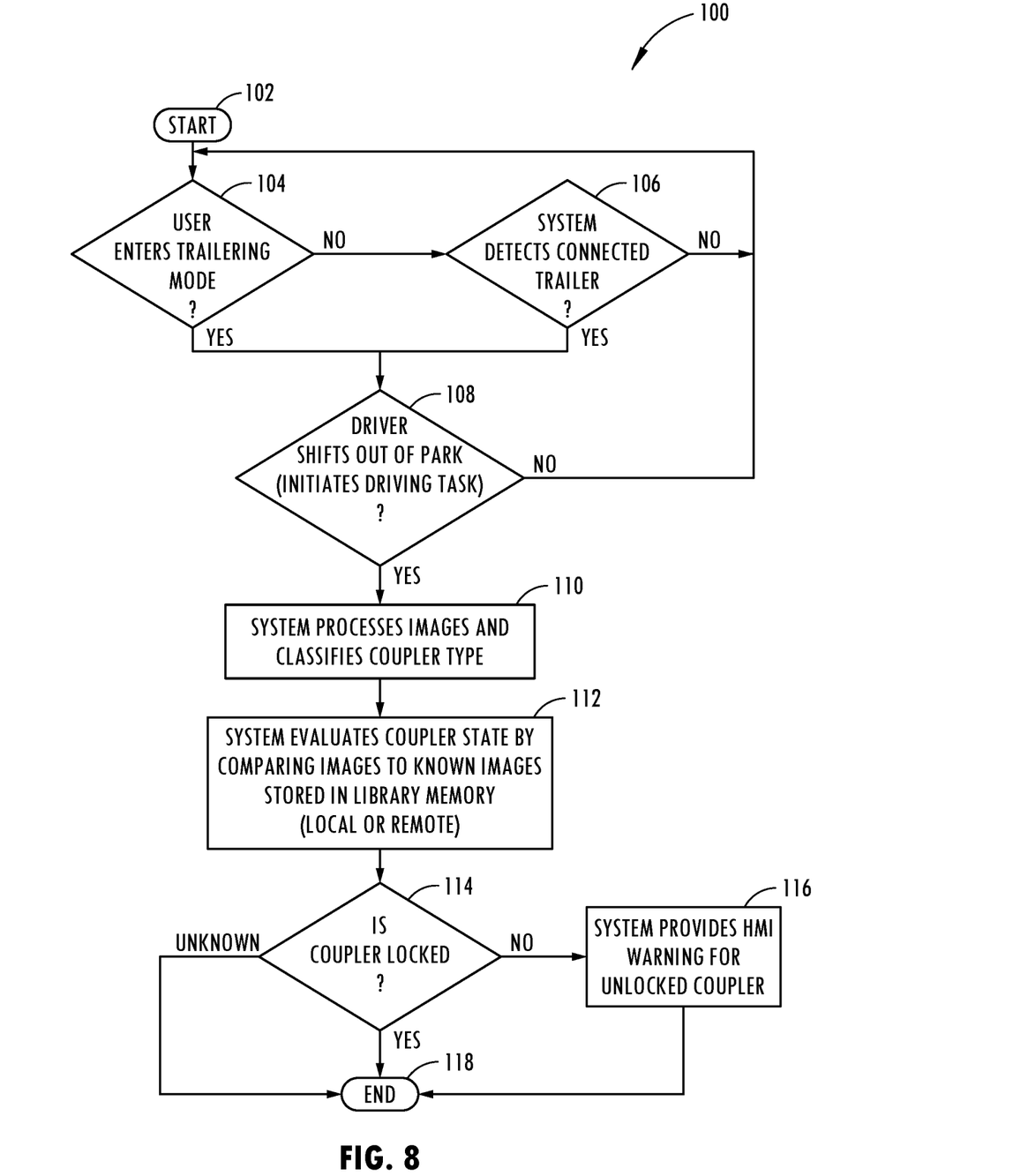
FIG. 8 is a flow diagram illustrating the trailer coupler lock detection and control routine.

Referring to FIG. 8, the trailer coupler state detection and control routine 100 is illustrated according to one embodiment. Routine 100 begins at step 102 and proceeds to step 104 to determine if a user has entered a trailering mode and, if so, proceeds to step 108. If the user has not entered the trailering mode, routine 100 proceeds to step 106 to determine if the system detects a connected trailer and, if not, returns to start 102. If the system detects a connected trailer, routine 100 proceeds to step 108. The system may detect a connected trailer by employing one or more sensors to detect the presence of a trailer and/or detecting that the trailer wiring system is connected to the vehicle wiring system.

At decision step 108, routine 100 determines if a driver shifts out of park which is indicative of initiating a driving task and, if not, waits for such an event to occur. It should be appreciated that other driving task initiations may be used. If the driver shifts out of park, routine 100 proceeds to step 110 where the system processes captured images and classifies the trailer coupler type and then to step 112 where the routine 100 evaluates the coupler type to determine whether the coupler is in a locked or unlocked state by comparing captured images to known images stored in a library in memory. Next, at decision step 114, routine 100 determines if the trailer coupler is locked and, if so, ends at step 118. If the trailer coupler is not locked, routine 100 proceeds to step 116 where the system provides the HMI warning for an unlocked trailer coupler before ending at step 118.

Figure 9:
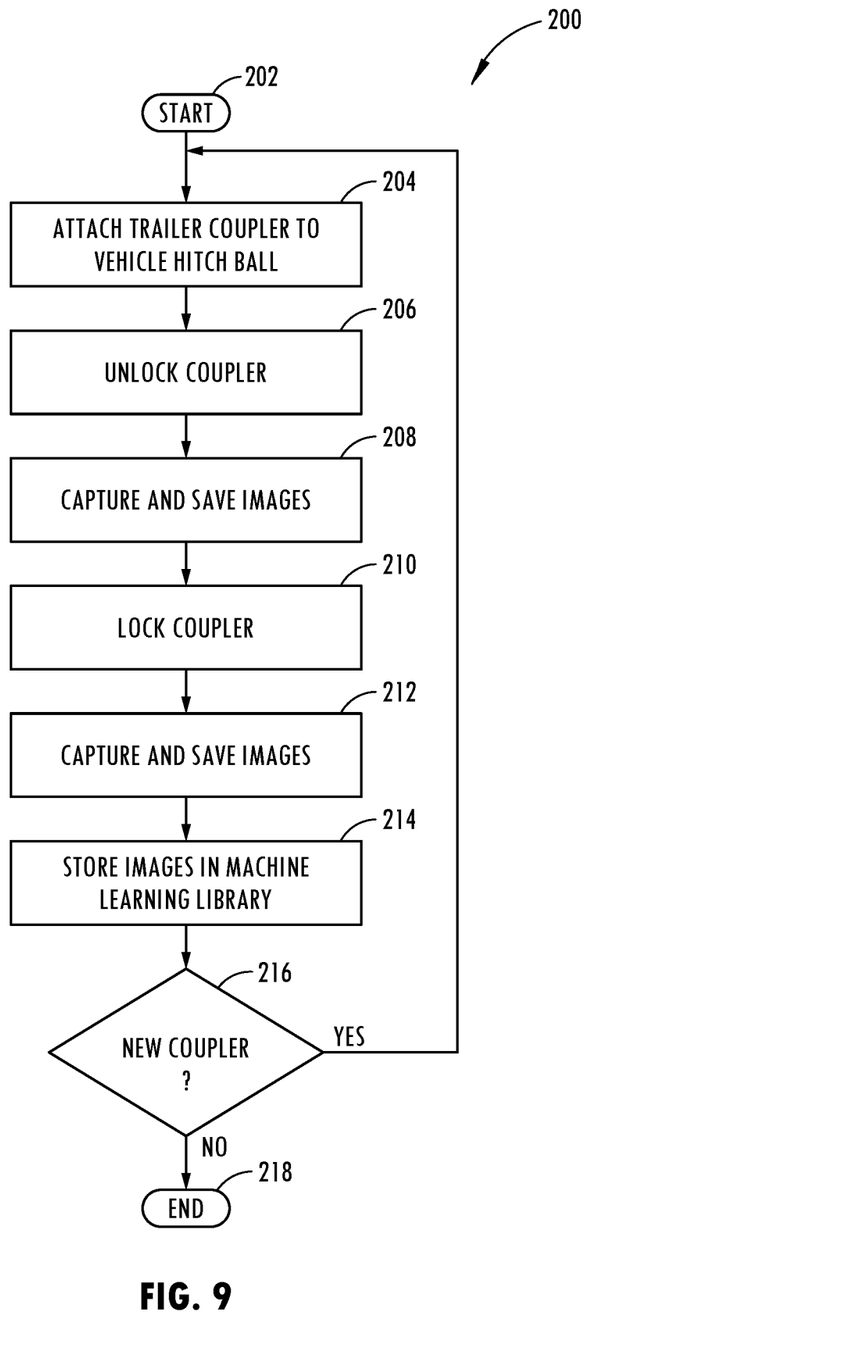
FIG. 9 is a flow diagram illustrating a machine learning routine for learning trailer coupler locked and unlocked states.

Referring to FIG. 9, a machine learning routine 200 is illustrating according to one embodiment. Routine 200 begins at step 202 and proceeds to step 204 with instructions to attach the trailer coupler to the vehicle hitch ball. Next, at step 206, an instruction is provided to a user to unlock the trailer coupler. Next, at step 208, with the trailer coupler unlocked captured images are acquired and saved in memory. At step 210, routine 200 provides instructions to the user to lock the coupler and, with the trailer coupler locked, then proceeds to step 212 to capture images of the trailer coupler and to save the images in memory. Routine 200 then proceeds to step 214 to store all of the captured images in a machine learning library in memory. Next, at decision step 216, routine 200 determines if a new coupler calibration process is requested and, if so, repeats the process steps of routine 200, otherwise routine 200 ends at step 218.

Accordingly, the vehicle 10 and trailer coupler system 20 for lock detection detecting a trailer coupler locked or unlocked state advantageously provides for an indication of the state of a trailer coupler and generates an output that may allow for a warning or other action to be provided to the driver of the vehicle indicating that the coupler lock is not locked such that a trailer vehicle disconnect may be prevented. It should be appreciated that the vehicle and system may be employed for trailer towing in general. Additionally, the system may be more specifically employed for a hitch assistance system (also referred to as a "hitch assist") system which assists with hitching the trailer to the vehicle. In such a situation, a driver of the vehicle is assisted with the process such that driver may inadvertently forget to lock the trailer coupler upon completion of the vehicle trailer connection.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle comprising:
a trailer hitch;
a camera oriented to capture images of the trailer hitch; and
a controller processing the captured images, detecting a trailer coupler coupled to the trailer hitch, determining a locked or unlocked state of the hitch coupler by comparing the captured images to known trailer coupler images, and generating an output indicative of the determined state of the trailer coupler, wherein the known images are leaded images, and wherein the learned images are earned by the controller during a calibration procedure by saving images of the hitch coupler in the locked and unlocked states.

2. The vehicle of claim 1, wherein the saved images are stored in memory.

3. The vehicle of claim 1, wherein the trailer hitch comprises a tow ball.

4. The vehicle of claim 1 further comprising a display for displaying the output as a warning to a driver of the vehicle.

5. A vehicle comprising:
a trailer hitch;
a camera oriented to capture images of the trailer hitch; and
a controller processing the captured images, detecting a trailer coupler coupled to the trailer hitch, determining a locked or unlocked state of the hitch coupler by comparing the captured images to known trailer coupler images, and generating an output indicative of the determined stat o the trailer coupler, wherein the controller further detects the vehicle is in a trailer mode before generating the output.

6. The vehicle of claim 5, wherein the controller detects the trailer mode when a driving task is initiated.

7. The vehicle of claim 6, wherein the initiation of the driving task comprises a vehicle transmission shifted out of park.

8. The vehicle of claim 5, wherein the controller detects the trailer mode by a user input.

9. A system for detecting a state of a trailer coupler connected to a vehicle trailer hitch on a vehicle, comprising:
a camera oriented to capture images of the vehicle trailer hitch; and
a controller processing the captured images, detecting the trailer coupler coupled to the vehicle trailer hitch, determining a locked or unlocked state of the trailer coupler by comparing the captured images to known trailer coupler images, and generating an output indicative of the determined state of the trailer coupler, wherein the known images are learned images, and wherein the learned images are learned by the controller during a calibration procedure by comparing images of the hitch coupler in the locked and unlocked states.

10. The system of claim 9, wherein the vehicle trailer hitch comprises a tow ball.

11. The system of claim 9 further comprising a display for displaying the output as a warning to a driver of the vehicle.

12. The system of claim 9, wherein the controller further detects the vehicle is in a trailer mode before generating the output.

13. The system of claim 12, wherein the controller detects the trailer mode when a driving task is initiated.

14. The vehicle of claim 13, wherein the initiation of a driving task comprises a vehicle transmission shifted out of park.

15. The system of claim 12, wherein the controller detects the trailer mode by a user input.

* * * * *

UNITED STATES PATENT AND TRADEMARK OFFICE
CERTIFICATE OF CORRECTION

PATENT NO. : 11,040,588 B2  
APPLICATION NO. : 16/404923  
DATED : June 22, 2021  
INVENTOR(S) : Niewiadomski Page 1 of 1

It is certified that error appears in the above-identified patent and that said Letters Patent is hereby corrected as shown below:

In the Claims

Column 8:  
Claim 1, Line 10:  
"earned" should be --learned--.  
Claim 5, Line 28:  
"stat o" should be --state of--.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*